United States Patent [19]

Hennings et al.

[11] Patent Number: 4,598,055

[45] Date of Patent: Jul. 1, 1986

[54] METHOD OF MANUFACTURING CERAMIC SINTERED BODIES

[75] Inventors: Detlev F. K. Hennings, Aachen; Rolf P. Janssen, Hamburg, both of Fed. Rep. of Germany; Piet Reijnen, Moresnet-Chapelle, Belgium

[73] Assignee: U.S. Philips Corporation, New York, N.Y.

[21] Appl. No.: 720,780

[22] Filed: Apr. 8, 1985

[30] Foreign Application Priority Data

Apr. 11, 1984 [DE] Fed. Rep. of Germany ....... 3413585

[51] Int. Cl.$^4$ ............................................ C04B 35/46
[52] U.S. Cl. ...................... 501/137; 264/61; 264/125; 264/332; 501/1; 501/135; 501/136; 501/138
[58] Field of Search ............ 264/60, 61, 65, 332, 264/125; 501/1, 135, 136, 137

[56] References Cited

U.S. PATENT DOCUMENTS

| | | | |
|---|---|---|---|
| 2,966,420 | 12/1960 | Prokopowicz et al. | 501/137 |
| 3,523,028 | 8/1970 | Prokopowicz | 501/137 |
| 4,054,627 | 10/1977 | Ownby | 501/126 |
| 4,417,227 | 11/1983 | Hennings | 338/21 |

OTHER PUBLICATIONS

Hennings, D. "Recrystallization of Barium Titanate Ceramics," *Science of Ceramics*, vol 12, pp. 405–409 (1984).

Schmelz, H. "Anomalous Grain Growth in BaTiO$_3$ Ceramics," *Science of Ceramics*, vol. 12, pp. 341–347 (1984).

*Primary Examiner*—Helen M. McCarthy
*Attorney, Agent, or Firm*—Marc D. Schechter

[57] ABSTRACT

A method of manufacturing ceramic sintered bodies. A basic starting material corresponding to the sintered body is mixed with compounds which form a melting phase with the starting material during sintering. Prior to the sintering, presintered starting material nuclei having an average crystallite size which corresponds at least three times the average crystallite size of the basic starting material are added to the basic material and melt-forming compounds. The nuclei are added in a quantity of at least 0.1% by weight of the starting material to be sintered. By this addition the grain size and grain distribution in the ceramic sintered body of materials with discontinuous grain growth can be effectively checked and controlled.

12 Claims, No Drawings

METHOD OF MANUFACTURING CERAMIC SINTERED BODIES

BACKGROUND OF THE INVENTION

The invention relates to a method of manufacturing ceramic sintered bodies. In the method the starting material includes the basic material of the sintered body to be manufactured and with the addition of compounds which form a melting phase with the basic material but which are not incorporated in the crystal lattice of the sintered body.

Alkaline earth titanates, alkaline earth zirconates, alkaline earth stannates or mixed crystals thereof are, for example, the basic material of the sintered body for a series of important electronic components. Such components are for example, ceramic multilayer capacitors, grain boundary barrier layer capacitors, or PTC resistors. Both in these capacitors and in these resistors, the electrical properties are determined principally by the ceramic microstructure.

In such a ceramic capacitor, for example, the value of the dielectric constant of the material and the temperature dependence thereof vary with the average grain size of the material. In PTC resistors, for example, the value of the resistance step and of the cold resistance vary with the average grain size and the homogeneity of the ceramic structure. In boundary grain barrier layer capacitors the breakdown strength and the insulation resistance, vary with the grain size and the grain size distribution. Methods of controlling and influencing the microstructure of the corresponding ceramic sintered bodies are hence of great importance in the manufacture of the these electronic components.

The ceramic microstructure, and, hence the average grain size snd the homogeneity of the ceramic structure, is also an important parameter in other ceramic sintered bodies used in electronic components. For example, in an oxide ceramic which is used in high temperature processes the lifetime, the strength and the temperature fluctation resistance are also determined by the ceramic microstructure. The same applies, for example, to oxide ceramics for which particularly good mechanical properties are required, for example for cutting tools and for machine construction.

Experiments on the grain growth of barium titanate as a basic starting material for a ceramic sintered body have demonstrated that samples, with a small excess of $TiO_2$ or other additions which form a melting phase with the barium titanate at a given temperature show discontinuous grain growth (hence a recrystallization) above the eutectic temperature. This phenomenon applies equally to other starting materials with additions forming a melting phase.

For example, in barium titanate with an excess of $TiO_2$, $Ba_6Ti_{17}O_{40}$ forms a melting phase with $BaTiO_3$ at temperatures of 1310° to 1320° C. Discontinuous grain growth (recrystallization) in the barium titanate and its mixed crystals is also found at temperatures around 1050° C. to 1200° C. by other additions, for example, mixtures of $CuO-Cu_2O$ with a further metal oxide. Experiments performed by applicants have demonstrated that additions of $CuO.MeO_x$, in which $MeO_x$ is the oxide of at least one element of group III, V, VI or VII of the periodic table of elements, as a compound forming a melting phase lead to an increased grain growth in alkaline earth titanates, alkaline earth zirconates, alkaline earth stannates and mixed crystals thereof.

The grain growth within a melting phase is desired, for example, to improve the electrical properties of perovskite ceramics. The addition forming the melting phase with the basic starting material is substantially not incorporated in the perovskite lattice. The liquid phase is capable of dissolving certain parts of the solid perovskite phase and precipitating them again in another location.

"Substantially not incorporated in the pervoskite lattice" means that in perovskite ceramic sintered at sintering temperatures <1200° C., elements from compounds forming the melting phase are not detectable in the crystal lattice, and that in perovskite ceramic sintered at sintering temperatures >1200° C. only traces of these elements are detectable in a quantity of $\leq 0.1\%$. The described method of manufacturing ceramic sintered bodies could almost be considered as a crystal growth from the melt which in this case is performed on the microscale in the ceramic structure. The melt flux is present, in this method, at the grain boundaries and embeds the microcrystals of the ceramic substantially without penetrating into the crystals. This accelerated diffusion transport between the grains of the perovskite phase may be considered as the basis for the increased growth and for the activated sintering behavior.

Extensive studies have demonstrated that the recrystallization process in barium titanate is initiated by a nucleation process. Individual grains grow substantially more rapidly than most of the grains surrounding them so that these preferred grains (or nuclei) finally fill the whole microstructure due to their strong growth.

The number and distribution of these so-called nuclei determine the average grain size of the recrystallized barium titanate. It is to be noted that the exact nature of the nuclei is not clear from a scientific point of view. Some authors suspect that only grains with crystal defects become active as nuclei. Others suspect that grains which, within the given grain size distribution, exceed a given size serve as nuclei.

A disadvantage of ceramic sintered bodies generally, and not only in those having a perovskite structure, is that the grain growth occurs statistically and discontinuously. The average grain size in a desired direction, hence toward a given effect, cannot substantially be influenced.

SUMMARY OF THE INVENTION

It is an object of the invention to control discontinuous grain growth and the average grain size to obtain a desired grain distribution in the manufacture of ceramic sintered bodies.

According to the invention this object is achieved by adding to the starting materials, prior to sintering, nuclei in the form of presintered basic starting material of an average crystallite size which corresponds at least to three times the average crystallite size of the basic material. The nuclei form the melting phase, and are added in a quantity of at least 0.1% by weight of the basic starting material to be sintered.

The invention is based on the discovery of the fact that the addition of presintered coarse grains of the basic starting material whose crystallite diameter is at least three times larger than the crystallite diameter of the basic starting material, considerably increases the number of the recrystallizing grains throughout the sintering. As a direct result of the high nuclei density already present at the beginning of the sintering, the average grain size of the ceramic structure decreases considerably.

The samples thus prepared were then compared. The results of the sintering experiments are recorded in the table below.

TABLE

| Sintering conditions | BaTiO3 according to I | | BaTiO3 according to III | | BaTiO3 according to II | | | BaTiO3 according to V | | | BaTiO3 according to VI | | | BaTiO3 according to VII | | |
|---|---|---|---|---|---|---|---|---|---|---|---|---|---|---|---|---|
| | A [%] | d [μm] | A [%] | d [μm] | N [mm$^{-2}$] | A [%] | d [μm] | N [mm$^{-2}$] | A [%] | d [μm] | N [mm$^{-2}$] | A [%] | d [μm] | N [mm$^{-2}$] | A [%] | d [μm] |
| 1310° C. 1000 sec. | — | — | — | — | 64 | 4 | — | 430 | 6 | — | 2660 | 10 | — | 10350 | 25 | — |
| 1330° C. 300 sec. | — | — | — | — | 1570 | 50 | — | 1630 | 50 | — | 4770 | 70 | — | 16450 | 95 | 5.64 |
| 1330° C. 1500 sec. | — | — | — | — | 2080 | 85 | 21.81 | 2180 | 85 | 20.76 | 6070 | 90 | 10.88 | 16340 | 98 | 6.06 |
| 1350° C. 300 sec. | 100 | 37 | 100 | 29 | 2500 | 100 | 22.6 | 2660 | 100 | 20.68 | 7230 | 100 | 9.24 | 14580 | 100 | 6.86 |

A = Recrystallized surfaces
N = Number of recrystallized nuclei per unrecrystallized surface
d = Average grain diameter of the recrystallized nuclei With the addition of nuclei in the form of presintered basic starting material having crystallite sizes which are very much larger than that of the basic starting material, those skilled in the art have an excellent means to control the grain growth of recrystallizing ceramic and to adapt it to desired purposes.

In connection with the description of the present method, "crystallite size" is to be understood to mean the size of a single crystal. "Particle size" is to be understood to mean the size of a particle which is formed from one or more crystallites. The term "grain size" means the monocrystalline or coherent lattice ranges within the ceramic structure.

DESCRIPTION OF THE PREFERRED EMBODIMENTS

In the examples, barium titanate powders with different excesses of TiO$_2$ were manufactured and recrystallized at temperatures of 1300° C. or higher. A given quantity of coarse granular nuclei of known crystallite size from presintered basic starting material was added to some of the powders. The number of recrystallized grains (nuclei) after a given sintering time, and the average grain size after complete recrystallization were compared between powders with and without nuclei.

The following powders were prepared:

I. BaTiO$_3$, with a particle size distribution in the range from 0.3 to 6 μm with an average particle size of 0.8 μm and with an atomic ratio of barium: titanium of 1:1.006.

II. BaTiO$_3$ according to I but with an atomic ratio of barium:titanium of 1:1.02.

III BaTiO$_3$, according to I but with an atomic ratio of barium:titanium of 1:1.1.

IV. BaTiO$_3$ with a crystal size distribution in the range from 2 μm to 5.5 μm with an average crystallite size of 3.2 μm, with an atomic ratio of barium:titanium of 1:1.006. This powder constitutes the coarse grains of basic starting material.

V. BaTiO$_3$ according to II, mixed with 0.1% by weight of BaTiO$_3$ according to IV.

VI. BaTiO$_3$ according to II, mixed with 1% by weight of BaTiO$_3$ according to IV.

VII. BaTiO$_3$ according to II, mixed with 5% by weight of BaTiO$_3$ according to IV.

The BaTiO$_3$ powders according to I to VII were sintered after being compressed into tablets, at temperatures from 1310° to 1350° C. The powders were sintered for 300 to 1500 seconds. The microstructures of the samples thus prepared were then compared.

Manufacture of the starting materials (BaTiO$_3$ according to samples I to III)

For producing the BaTiO$_3$ according to sample I a powder of a high purity (total impurities equal to 200 wt. ppm) and an average particle size of 0.8 μm was used. The average particle size was determined by sedimentation analysis in 1% sodium pyrophosphate solution. The barium titanate contained a small TiO$_2$ excess, corresponding to an atomic ratio of barium:titanium of 1:1.006. The atomic ratio was determined by X-ray fluorescence analysis.

BaTiO$_3$ according to samples II and III having atomic atomic ratios of barium:titanium of 1:1.02 and 1:1.01, respectively, were made by adding corresponding quantities of TiO$_2$ to BaTiO$_3$ according to sample I. In order to distribute the TiO$_2$ as uniformly as possible, barium titanate powders according to sample I and TiO$_2$ were dispersed in isopropanol in a supersonic bath. After switching off the ultrasound, BaTiO$_3$ and TiO$_2$ deposited immediately so that no separation occurred. The isopropanol was decanted substantially. The deposited material was then dried at approximately 100° C.

(BaTiO$_3$ according to IV)

Approximately 350 g of barium titanate powder according to sample I were compressed into cylindrical bodies in a press at a pressure of 2.5×10$^8$ N/mm$^2$ and were then fired in air at 1350° C. for 90 minutes on a platinum sheet. The heating and cooling time was approximately 100 minutes. The BaTiO$_3$, sintered to an average crystallite size of 30 μm after firing was reduced to a particle size of 80 μm in a steel motor. It was then ground to an average crystallite size of 8 μm during 90 minutes in an agate ball mill.

The powder was then divided into different grain sizes by repeated sedimentation in a four-stage cascade separator. A 0.1% sodium pyrophosphate solution served as the dispersing agent. The powder was repeatedly passed through the cascades until a crystallite size distribution between 2 μm and 5.5 μm with an average crystallite size of 3.2 μm, was obtained.

The sodium pyrophosphate was washed out after sedementation, with hot water by rinsing several times.

Manufacture of the powder mixtures (samples V to VII)

Powder according to sample II was mixed ultrasonically with the coarse grain powder according to sample IV in tetrahydrobenzol. The powders according to V, according to VI and according to VII were manufactured by the addition of 0.1% by weight, 1% by weight and 5% by weight of the powder according to IV.

Sintering of the samples

The powders of samples I to VII were compressed into tablets of 6 mm diameter and approximately 0.5 mm thickness in a conventional tableting machine. A diluted solution of polyvinyl alcohol was used as a binder. The compressed tablets, after combustion of the binder were then very rapidly transferred to a furnace which was already at the test temperature. The tablets were then sintered on a platinum sheet at temperatures of 1310° C. to 1350° C. for 300 seconds to 1500 seconds. The number of recrystallized grains (nuclei) per surface was determined as an average value of 3 samples, after providing cuts and etching, by evaluation of micro-photographs.

It is quite clear from the Table that the addition of sintered coarse grains, the crystallite diameter of which is at least three times larger than the crystallite diameter of the basic starting material, considerably increases the number of recrystallized grains from the beginning of the sintering. It is important that as a direct result of the nucleation density, which is already high at the beginning of the sintering, the average grain size of the ceramic structure decreases considerably. The number of recrystallized grains (nuclei) per surface unit after the addition of coarse grain nuclei is very high and increases much more slowly than in samples without the addition of coarse grain nuclei. So the addition of such nuclei provides those skilled in the art with a means to check and control the grain size and grain distribution of materials with discontinuous grain growth.

The manufacture of barium titanate bodies was described by way of example. The method can also be carried out efficaciously when using other starting materials in manufacture of ceramics which have a discontinuous grain growth which is to be controlled. Also, for example, the basic starting material may be doped with a small quantity of metal oxide to produce n-type or p-type conductivity.

What is claimed is:

1. A method of manufacturing ceramic sintered bodies, said method comprising the steps of:
    providing a starting material which forms the basic crystal lattice of the ceramic, said starting material having an average crystallite size;
    mixing with the basic starting material a melt phase-forming compound, said melt phase-forming compound and said basic starting material forming a melt phase during sintering, said melt phase-forming compound not being incorporated into the crystal lattice of the ceramic during sintering;
    adding to the mixture of basic starting material and melt phase-forming compound nuclei of presintered basic starting material, said presintered nuclei having an average crystallite size at least three times the average crystallite size of the basic starting material, said presintered nuclei being added in a quantity of at least 0.1% by weight of the basic starting material; and
    sintering the mixture to form ceramic bodies.

2. A method as claimed in claim 1, wherein the presintered nuclei have an average crystallite size equal to five times the average crystallite size of the basic starting material.

3. A method as claimed in claim 1, wherein the presintered nuclei have crystallite sizes in the range from 2 microns to 5.5 microns.

4. A method as claimed in claim 1, wherein the presintered nuclei are added in a quantity of 1 to 5% by weight of the basic starting material.

5. A method as claimed in claim 1, wherein the basic starting material is doped with a small quantity of a metal oxide to produce an n-type or p-type conductivity.

6. A method as claimed in claim 1, wherein the basic starting material consists essentially of one or more of the group of alkaline earth titanates, alkaline earth zirconates, alkaline earth stannates, and mixed crystals thereof.

7. A method as claimed in claim 6, wherein the melt phase-forming compound is $TiO_2$.

8. A method as claimed in claim 6, wherein the basic starting material comprises $BaTiO_3$ with a particle size from 0.3 to 6 microns.

9. A method as claimed in claim 8, wherein the $BaTiO_3$ has an average particle size of 0.8 microns.

10. A method as claimed in claim 8, wherein the basic starting material has a barium to titanium ratio of from 1:1.006 to 1:1.1.

11. A method as claimed in claim 10, wherein the basic starting material has a barium to titanium ratio of 1:1.02.

12. A method as claimed in claim 11, wherein the presintered nuclei comprise presintered $BaTiO_3$.

* * * * *